United States Patent
Schade et al.

(10) Patent No.: US 6,350,834 B1
(45) Date of Patent: Feb. 26, 2002

(54) METHOD FOR RETARDED ANIONIC POLYMERIZATION

(75) Inventors: Christian Schade, Ludwigshafen; Wolfgang Fischer, Walldorf; Hermann Gausepohl, Mutterstadt; Konrad Knoll, Ludwigshafen; Volker Warzelhan, Weisenheim, all of (DE); Michel Fontanille, Talence; Alain Deffieux, Talence-Cedex, both of (FR); Philippe Desbois, Maikammer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,210

(22) PCT Filed: Feb. 5, 1999

(86) PCT No.: PCT/EP99/00773

§ 371 Date: Aug. 14, 2000

§ 102(e) Date: Aug. 14, 2000

(87) PCT Pub. No.: WO99/42499

PCT Pub. Date: Aug. 26, 1999

(30) Foreign Application Priority Data

Feb. 18, 1998 (DE) .......................................... 198 06 775

(51) Int. Cl.$^7$ ............................. C08F 4/52; C08F 297/04
(52) U.S. Cl. ...................... 526/177; 526/178; 526/186; 526/187; 526/189; 526/195; 526/196; 526/346; 525/272

(58) Field of Search .................................. 526/177, 178, 526/346, 186, 187, 189, 195, 196; 525/272, 314

(56) References Cited

U.S. PATENT DOCUMENTS

| | | | |
|---|---|---|---|
| 3,716,495 A | 2/1973 | Hsieh | |
| 4,079,176 A | 3/1978 | de Zarauz | |
| 4,530,984 A | * 7/1985 | Hall | ........................ 526/177 |

FOREIGN PATENT DOCUMENTS

| | | |
|---|---|---|
| DE | 26 28 380 | 12/1976 |
| EP | 234 512 | 9/1987 |
| WO | 98/07765 | 2/1998 |

OTHER PUBLICATIONS

J.Am.Chem.Soc., Welch, vol. 82 (1960) 6000–6005.

* cited by examiner

*Primary Examiner*—Fred Teskin
(74) *Attorney, Agent, or Firm*—Keil & Weinkauf

(57) ABSTRACT

In a process for the homopolymerization of vinylaromatic monomers or the copolymerization of vinylaromatic monomers and dienes in the presence of at least one alkali metal compound and at least one compound of an element of group 3a of the Periodic Table of the elements, the compounds contain, based on the sum of molar equivalents of alkali metal and elements of group 3a, in each case a) from 0.1 to 3.9 molar equivalents of oxygen, sulfur, nitrogen or phosphorus and b) from 0.1 to 3.9 molar equivalents of an organyl ligand.

11 Claims, No Drawings

METHOD FOR RETARDED ANIONIC POLYMERIZATION

The present invention relates to a process for the homopolymerization of vinylaromatic monomers or the copolymerization of vinylaromatic monomers and dienes in the presence of at least one alkali metal organyl or alkali metal alkoxide and at least one aluminum or boron organyl and to an initiator composition for carrying out the process.

Anionic polymerizations typically proceed very rapidly, so that they are difficult to control on an industrial scale owing to the considerable amount of heat generated. Lowering the polymerization temperature results in an excessive increase in viscosity, in particular with a concentrated solution. Reducing the initiator concentration increases the molecular weight of the polymer formed. Controlling the reaction by appropriate dilution of the monomers results in a higher solvent requirement and lower space-time yields.

It has therefore been proposed to include in the anionic polymerization initiators various additives to influence the polymerization rate.

The effect of Lewis acids and Lewis bases on the rate of the anionic polymerization of styrene has been described in Welch, Journal of the American Chemical Society 82 (1960), 6000–6005. For instance, it has been found that small amounts of Lewis bases such as ethers and amines accelerate the n-butyllithium-initiated polymerization of styrene at 30° C. in benzene, whereas Lewis acids such as zinc and aluminum alkyls reduce the polymerization rate or, when used in superstoichiometric amounts, stop the polymerization completely.

U.S. Pat. No. 3,716,495 discloses initiator compositions for the polymerization of conjugated dienes and vinylaromatics where a more efficient use of the lithium alkyl as initiator is achieved by the addition of a metal alkyl of a metal of group 2a, 2b or 3a of the Periodic Table of the Elements, such as diethylzinc and polar compounds such as ethers or amines. Owing to the required large amounts of solvent, relatively low temperatures and long reaction times in the region of several hours, the space-time yields are correspondingly low. PCT/EP97/04497, which was unpublished at the priority date of the present invention, describes continuous processes for the anionic polymerization or copolymerization of styrene or diene monomers using alkali metal alkyl as polymerization initiator in the presence of an at least bivalent element as a retarder.

Various initiator mixtures which may comprise alkali metals, alkaline earth metals, aluminum, zinc or rare earth metals are known, for example, from EP-A 0 234 512 for the polymerization of conjugated dienes with a high degree of 1,4-translinking. German Offenlegungsschrift 26 28 380 teaches, for example, the use of alkaline earth aluminates as cocatalyst in conjunction with an organolithium initiator for the preparation of polymers or copolymers of conjugated dienes having a high trans-1,4-linkage content and low 1,2-linkage or 3,4-linkage contents. This is said to lead to an increase in polymerization rate.

The use of additives such as aluminum alkyls which have a strong retarding effect on the anionic polymerization requires exact dosage and temperature control. A slight underdosage may lead to an insufficient retardation of the reaction rate, whereas a slight overdosage may completely stop the polymerization.

It is an object of the present invention to provide a process for the homopolymerization of vinylaromatic monomers or the copolymerization of vinylaromatic monomers and dienes which does not have the abovementioned disadvantages, and, in particular, to provide an initiator composition for the process which makes it possible to adjust the polymerization rate within wide temperature and concentration ranges.

We have found that this object is achieved by a process for the homopolymerization of vinylaromatic monomers or the copolymerization of vinylaromatic monomers and dienes in the presence of at least one alkali metal compound and at least one compound of an element of group 3a of the Periodic Table of the Elements, the compounds containing, based on the sum of molar equivalents of alkali metal and elements of group 3a in each case, a) from 0.1 to 3.9 molar equivalents of oxygen, sulfur, nitrogen or phosphorus and b) from 0.1 to 3.9 molar equivalents of an organyl ligand.

It is immaterial whether the alkali metal compound or a compound of an element of group 3a or both contain oxygen, sulfur, nitrogen or phosphorus or an organyl ligand. It is therefore also possible to use mixtures of compounds having only organyl ligands and compounds having only some or no organyl ligands and contain the corresponding hetero atoms. The ranges given for the hetero atoms or organyl ligands apply to the sum of molar equivalents of all alkali metals and elements of group 3a, irrespectively of the ratio of alkali metal to element of group 3a selected in each case.

For the purposes of the invention organyl ligands are ligands which are attached to the alkali metal or element of group 3a of the Periodic Table of the Elements via a more or less polar direct bond between metal and carbon.

The hetero atoms preferably stem from alkoxide, thiolate, amide, imide or phosphide ligands attached to the alkali metal or the element of group 3a of the Periodic Table of the Elements. However, it is also possible for the hetero atoms to be present as bridges between the elements, as in aluminoxanes or boroxanes.

The alkali metal compound used is preferably an alkali metal organyl, alkali metal alkoxide, alkali metal thiolate or alkali metal amide, and the compound of an element of group 3a of the Periodic Table of the Elements used is preferably an aluminum or boron organyl.

Alkali metal organyls which may be used are mono-, bi- or multifunctional alkali metal alkyls, aryls or aralkyls customarily used as anionic polymerization initiators. It is advantageous to use organolithium compounds such as ethyllithium, propyllithium, isopropyllithium, n-butyllithium, sec-butyllithium, tert-butyllithium, phenyllithium, diphenylhexyllithium, hexamethylenedilithium, butadienyllithium, isoprenyllithium or polystyryllithium or the multifunctional compounds 1,4-dilithiobutane, 1,4-dilithio-2-butene or 1,4-dilithiobenzene. The amount of alkali metal organyl required depends on the desired molecular weight, the type and amount of the other metal organyls used and the polymerization temperature and is typically in the range from 0.0001–5 mol percent, based on the total amount of monomers.

Alkali metal alkoxides which may be used, alone or in admixture, are aliphatic, aromatic or araliphatic alkoxides of lithium, sodium or potassium. Examples are lithium, sodium or potassium methoxide, ethoxide, n-propoxide, isopropoxide, n-butoxide, sec-butoxide, tert-butoxide, n-pentoxide, isopentoxide, hexoxide, amyl alkoxide, 3,7-dimethyl-3-octoxide, phenoxide, 2,4-di-tert-butylphenoxide, 2,6-di-tert-butylphenoxide, 3,5-di-tert-butylphenoxide, 2,4-di-tert-butyl-4-methylphenoxide and trimethylsilanoate. Preference is given to using the methoxides, ethoxides, tert-butyl-substituted phenoxides or branched alkyl alkoxides, in particular lithium tert-butoxide, amyl alkoxide or 3,7-dimethyl-3-octoxide.

Alkali metal thiolates which may be used, alone or in admixture, are aliphatic, aromatic or araliphatic thiolates of lithium, sodium or potassium. Examples are lithium, sodium or potassium methyl sulfide, ethyl sulfide, butyl sulfide, hexyl sulfide, decyl sulfide, dodecyl sulfide, stearyl sulfide, thiophenoxide, tolyl sulfide, cyclohexyl sulfide or dilithium 1,2-dimercaptoethane. Preference is given to aliphatic thiolates having from 8 to 18 carbon atoms in the alkyl chain.

Alkali metal amides which may be used, alone or in admixture, are lithium, sodium or potassium salts of ammonia or primary or secondary amines having aliphatic, aromatic or araliphatic substituents. Examples of suitable amides are lithiumamide, N-lithiummethylamide, N-lithiumethylamide, N-lithiumpropylamide, N-lithiumbutylamide, N-lithiumamylamide, N-lithiumphenylamide or the corresponding sodium or potassium salts; N-lithiumdimethylamide, N-lithiumdiethylamide, N-lithiumdipropylamide, N-lithiumdibutylamide, N-lithiumdiamylamide, N-lithium-(N,N-bis-trimethylsilyl)amide, N-lithiumdicyclohexylamide, N-lithium-N-methylanilide, N-lithium-N-ethylanilide, N-lithiummorpholide, N-lithiumdiphenylamide, N-lithiumpiperidide or N-lithiumimidazolide. Particular preference is given to salts of secondary aliphatic amines, very particular preference being given to N-lithiumdiisopropylamide.

Aluminum or boron organyls which may be used are those of the formula $R_3Al$ or $R_3B$, wherein the radicals R are each, independently of one another, hydrogen, halogen, $C_1$-$C_{20}$-alkyl or $C_6$-$C_{20}$-aryl. Preferred aluminum organyls are aluminum trialkyls such as trimethylaluminum, triethylaluminum, triisobutylaluminum, tri-n-butylaluminum, triisopropylaluminum, tri-n-hexylaluminum, diethylaluminum hydride, diisobutylaluminum hydride or isoprenylaluminum. Particular preference is given to using triisobutylaluminum. It is also possible to use aluminum organyls which are formed by partial or complete hydrolysis, alcoholysis, aminolysis, thiolysis, phosphinolysis or oxidation of alkyl- or arylaluminum compounds or those which are complex with alkoxides, thiolates, sulfides, amides, imides, nitrides or phosphides. Examples of such organoelement compounds carrying hetero substituents are diethylaluminum N,N-dibutylamide, diethylaluminum ethoxide, diisobutylaluminum ethoxide, diisobutyl-(2,6-di-tert-butyl-4-methyl-phenoxy)aluminum, methylaluminoxane, isobutylated methylaluminoxane, isobutylaluminoxane, tetraisobutyldialuminoxane or bis(diisobutyl)aluminum oxide, diethylboron methoxide, trimethylboroxine, 2-phenyl-1,3,2-dioxaborinane and the like. Further examples are aluminum alkoxides such as aluminum trimethoxide, aluminum triethoxide, aluminum tripropoxide, aluminum tributoxide, etc. or boric acid trialkyl esters. Preference is given to using the aluminum compounds, especially those having oxo or alkoxide groups. Very particular preference is given to using diethylaluminum ethoxide, diisobutylaluminum ethoxide, methyl aluminoxane, aluminum propoxide and aluminum tri-sec-butoxide.

The molar ratios of the metal organyls with respect to each other may vary within wide limits, but depend primarily on the desired retardation effect, the polymerization temperature, the monomer composition and concentration and the desired molecular weight. The most favorable metal ratio is advantageously exactly determined in a preliminary experiment, the aluminum or boron organyl content being selected such that the desired reaction temperature or rate of reaction is not exceeded.

The molar ratio of alkali metal and aluminum or boron is advantageously in the range from 0.002/1 to 100/1, preferably in the range from 0.01/1 to 10/1, particularly preferably in the range from 0.3/1 to 1.25/1.

In the process of the invention use is made primarily of alkali metal organyls and aluminum organyls. Barium, calcium or strontium organyls are preferably only present in ineffective amounts not having a significant effect on the polymerization rate or copolymerization parameters. Transition metals or lanthanoids, especially titanium or zirconium, should not be present in significant amounts.

In addition, an alkoxide, thiolate, amine or phosphine, either in the free form or complexed with the alkali metal or aluminum, is present during the polymerization.

The alkoxides, thiolates, amides, imides or phosphides are formed, for example, by adding, to the initiator solution comprising alkali organyl, aluminum or boron organyl or to the polymerization solution, an alcohol of the formula ROH, a thiol of the formula RSH, an amine of the formula $R_2NH$ or $RNH_2$ or phosphine of the formula $PR_2H$ or $PRH_2$ wherein the radicals R are each, independently of one another, hydrogen, halogen, $C_1$-$C_{20}$-alkyl, $C_6$-$C_{20}$-aryl or $C_6$-$C_{20}$-aralkyl. Particular preference is given to those having linear, branched or cyclic $C_1$-$C_{12}$-alkyl radicals. Examples are methanol, ethanol, n-propanol, isopropanol, n-butanol, iso-butanol, 2-butanol, tert-butanol, n-propanol, iso-propanol, n-amyl alcohol, n-hexanol, n-heptanol, n-octanol, cyclohexanol, cyclopentanol, benzyl alcohol, phenol, 1-naphthol, 2,6-di-tert-butylphenol, 2,4,6-tri-tert-butylphenol, nonylphenol, 4-methylphenol or the corresponding thiols, amines or phosphines.

The alcohols, thiols, amines or phosphines may also carry several identical or different functional groups, e.g. 1,4-dioxabutyl and 1,5-dioxapentyl.

The molar proportion of the organyl ligands is preferably higher than the molar proportion of the alcohols, thiols, amines or phosphines, based on the sum of the constituents of the initiator. Preference is given to a molar ratio of organyl ligands and the sum of all alcohols, thiols, amines and phosphines in the range from 0.1 to 100, preferably from 1 to 50.

The alkali metal, aluminum and boron organyls and alkali metal alkoxides and also alcohols, thiols, amines or phosphines may be added to the monomer mixture together or separately and at different times or different locations. The abovementioned components are preferably used in the form of a premixed initiator composition.

The initiator composition may be prepared by mixing the alkali metal organyls, alkali metal alkoxides, aluminum or boron organyls dissolved in an inert hydrocarbon, such as n-hexane, cyclohexane or toluene. The metal organyls dissolved in the hydrocarbons are preferably homogeneously mixed and allowed to age at a temperature in the range from 0 to 120° C. for at least 2 minutes. A solubilizer, for example diphenylethylene, can be added, if necessary, to prevent the precipitation of one of the components from this initiator solution.

Preferred initiator compositions comprise an alkali metal alkyl or aryl of the formula $M^1R^1$ or alkali metal alkoxide of the formula $M^1OR^1$ and an aluminum or boron organyl of the formula $M^2R^1_{3-m}OR^2_m$ or aluminoxane or boroxane of the formula $M^2O_nR^2_{3-2n}$, wherein

| | |
|---|---|
| M¹ | is Li, Na, K |
| M² | is Al, B |
| R¹, R² | are each, independently of one another, hydrogen, $C_1$–$C_{20}$-alkyl, $C_6$–$C_{20}$-aryl or $C_6$–$C_{20}$-aralkyl, |
| m | is 0, 1, 2 or 3, and |
| n | is 0 or 1. |

Particular preference is given to initiator mixtures comprising a lithium organyl and an aluminum organyl. Preferred additives are alcohols or amines. Particular preference is given to an initiator composition comprising a lithium alkyl and a dialkylaluminum alkoxide.

Some of the initiator compositions of the invention may be composed of constituents which are not effective as polymerization initiators per se. It will be appreciated that the initiator compositions may also be composed of mixtures of two or more of the abovementioned components.

The initiator composition is suitable for the polymerization of anionically polymerizable monomers. The initiator composition is preferably used for the homopolymerization or copolymerization of vinylaromatic monomers and dienes. Preferred monomers are styrene, α-methylstyrene, p-methylstyrene, ethylstyrene, tert-butylstyrene, vinyltoluene or 1,1-diphenylethylene, butadiene, isoprene, 2,3-dimethylbutadiene, 1,3-pentadiene, 1,3-hexadiene or piperylene or mixtures thereof. Particular preference is given to using the initiator composition for the polymerization of styrene.

The polymerization may be carried out in the presence of a solvent. Suitable solvents are the aliphatic, cycloaliphatic or aromatic hydrocarbons having from 4 to 12 carbon atoms which are generally used for anionic polymerization, such as pentane, hexane, heptane, cyclohexane, methylcyclohexane, isooctane, decalin, benzene, alkylbenzene such as toluene, xylene, ethylbenzene or cumene or suitable mixtures. Obviously, the solvent must have the high purity which is typically required for the process. The solvents may be dried over aluminum oxide or molecular sieve and/or distilled prior to use to remove protic substances. The solvent from the process is preferably reused after condensation and the abovementioned purification.

It is possible to adjust the retarding effects within wide temperature ranges via the composition and amount of the metal organyl. It is therefore also possible to carry out the polymerization at initial monomer concentrations in the range from 50 to 100 percent by volume, particularly from 70 to 100 percent by volume, which lead to highly viscous polymer solutions and require higher temperatures, at least at higher conversions.

After the polymerization is completed, the living polymer ends may be capped with a chain terminator. Suitable chain terminators are protic substances or Lewis acids, such as water, alcohols, aliphatic or aromatic carboxylic acids and inorganic acids such as carbonic acid or boric acid.

The target products may be homopolymers or copolymers and mixtures thereof. Polystyrene and styrene/butadiene block copolymers are preferably obtained. The process of the invention may also be used to prepare high-impact polystyrene (HIPS), in which case polybutadiene, styrene/butadiene block copolymers or mixtures thereof may be used as rubbers.

The block copolymers may be coupled using multifunctional compounds such as polyfunctional aldehydes, ketones, esters, anhydrides or epoxides.

The process of the invention may be carried out in any pressure-and temperature-resistant reactor, it being possible in principle to use backmixing or non-backmixing reactors (i.e. reactors having stirred tank or tubular reactor characteristics). Depending on the choice of initiator concentration and composition, the particular process route applied and other parameters, such as temperature and possibly temperature profile, the process of the present invention leads to polymers having high or low molecular weight. It is possible to use, for example, stirred tanks, tower reactors, loop reactors and tubular reactors or tube bundle reactors with or without internals. Internals may be static or mobile.

The process may be carried out batchwise. However, preference is given to carrying out the process continuously and particularly at a high temperature, which may be achieved using various methods which are described in detail, for example in unpublished patent application PCT/EP97/04497.

In a preferred embodiment, the polymerization is carried out continuously under non-isothermal conditions and without backmixing, preferably in a tubular or tube bundle reactor, until conversion is complete, the temperature at the reactor outlet generally not exceeding 300° C.. It will be appreciated that the temperature profile across the conversion section depends on the geometry of this section. It is advantageous to carry out a preliminary experiment and to arrange, by using the appropriate amount and composition of the initiator mixture, for the desired temperature to be achieved at the reactor outlet or after complete conversion is achieved. This makes it possible to achieve virtually complete conversion within a favorable time. The residence time is for example from 0.1 to 1.5 hours. A residence time of not more than 1.2 hours is preferred.

According to the invention, another advantageous embodiment offering particular possibilities of product design is the conversion in a backmixing reactor, continually adding fresh initiator mixture or individual constituents thereof, together with the monomer or separately.

A particular advantage of the continuous polymerization in a backmixing reactor is the broader molecular weight distribution obtained, which is often desirable for the balance between many properties of the product.

The backmixing reactor used is, for example, a continuous stirred tank reactor (CSTR) or a recycle reactor.

Steady-state conditions are advantageously ensured by conducting the reaction under isothermal conditions.

The embodiment of the process according to the invention in a backmixing reactor generally takes place in stirred tanks or loop reactors, i.e. reactors in which the backmixing is achieved by recycling, in an ordered or unordered fashion, a product stream which is continuously supplied with fresh reaction mixture and from which reaction mixture converted to a greater or lesser degree is continuously discharged. It is also possible to use a combination of a plurality of backmixing units, for example a stirred tank battery. The reactors are advantageously designed to be sufficiently pressure-resistant to accommodate the vapor pressure of the reactants and adjuvants. However, the reaction is not particularly promoted by pressure. Suitable reactors are provided with customary conveying means, i.e. stirrers or propellers, to keep the liquid in motion, and may be provided with internals, if desired, which may be fixed (static) or mobile.

The reaction temperature in backmixing reactors during the conversion is advantageously kept constant and, when using styrene monomers, does not exceed 300° C., preferably 250° C., particularly preferably 200° C.. When using diene monomers, the conversion is advantageously conducted at no more than 150° C.. When using a stirred tank battery or other apparatus having the same effect, the temperature in subsequent reactors may be different and, for example, rising.

The conversion in the continuous, ideally backmixing reactor cannot, in theory, be complete. It is possible, however, e.g. in a recycle reactor, to achieve virtually quantitative conversion by appropriate selection of the process parameters, such as the recycle ratio, the reaction temperature or the residence time; a conversion of up to 95%, preferably up to 90%, particularly preferably up to 80%, is advantageous.

In another variation, the process of the invention is carried out in at least two reaction zones.

A first reaction zone is used for prepolymerization and is configured as a backmixing unit which is provided with a heat exchanger. It may be constructed as a stirred tank or as a loop reactor with or without static mixtures and may be divided, if desired, e.g. in the form of a stirred tank battery. A recycle reactor which is hydraulically operated, i.e. completely filled with liquid, may be advantageous, especially at higher reaction mixture viscosities. The desired conversion depends on the controllable viscosity of the reaction mixture and is generally selected to be as high as possible, so that the residence time to complete conversion in the subsequent second reaction zone is as short as possible and the maximum temperature is as low as possible and thus the extent of degradation or depolymerization is negligible. In this first reaction zone, it is advantageous to obtain a conversion of from 20 to 80% by weight, preferably from 40 to 60% by weight. The polymerization temperature in the first reaction zone is from 20 to 150° C., preferably from 40 to 120° C., very particularly preferably from 60 to 100° C..

The residence time in the first reaction zone is, for example, from 0.05 to 5 hours. Particular preference is given to a residence time of at least 0.3 hour. The heat of polymerization may be dissipated by evaporative cooling in the case of stirred tanks and via the wall in the case of recycle reactors.

The reaction mixture may be charged at the single location; however, it is also possible to charge a part of the monomers or parts or constituents of the initiator at a further, e.g. downstream, location. In this way, it is possible, for example, to achieve a multimodal molecular weight distribution.

In the second reaction zone, the conversion is completed. For this purpose, any reactor which is pressure- and temperature-resistant and essentially free from backmixing may be used. Tubular reactors or tube bundle reactors with or without internals are particularly suitable. Internals may be static or mobile. It is also possible to use annular disk reactors or tower reactors.

The temperature profile in the second reaction zone across the tube section is naturally dependent on the geometry of this section and on the conversion achieved in the first reaction zone. It is advantageous to carry out a preliminary experiment and to arrange that a temperature of from 150 to 250° C. is achieved, but the temperature of 300° C. is not exceeded, at the reactor outlet of the second reaction zone, i.e. after complete conversion is achieved. This achieves complete conversion within a favorable time. Complete conversion means in a practical sense that the residual monomer content is not higher than 100 ppm. However, conversion of less than 99%, e.g. from 95 to 98%, may be sufficient if further use is to be made of an existing devolatilization apparatus. In this case, the residual monomer contents may be higher than 100 ppm.

The temperature profile in the second reaction zone may be modified as desired by external temperature control. For example, the second reaction zone may be operated adiabatically, isoperibolically (with constant heat flow) or isothermally. By cooling or heating individual sections of the reactor of the second reaction zone, it is possible to set a temperature profile adapted to the reactor geometry or the desired properties of the product. It is advantageous to allow the temperature in the second reaction zone to increase toward the outlet by allowing the reaction to proceed adiabatically, i.e. by neither heating nor cooling. This reduces the likelihood of an excessive rise in viscosity as conversion increases and thus also permits virtually complete conversion to products having lower contents of residual monomers and oligomers. This is particularly important if it is desired to avoid further operations, i.e. to compound the resulting product immediately, if necessary after destruction of the living chain ends.

In a particular embodiment of the process, the second reaction zone consists of a one- or multiple-part tubular reactor without heat exchanger. It is possible to use a plurality of tubular reactors in series, if desired.

The polymerization is particularly preferably carried out to complete conversion in a tubular reactor without heat exchanger, the polymerization in the first reaction zone being carried out to a conversion of at least 40%.

The residence time in the second reaction zone is e.g. from 0.05 to 1 hour. A residence time of not more than 0.3 hour is preferred. The reaction is usually carried out at pressures of up to 10 bar, possibly of up to 100 bar.

The initiator composition according to the invention makes it possible to significantly reduce the reaction rate or increase the temperature, respectively, without affecting the polymer properties compared to anionic polymerization using an alkali metal organyl; this makes it possible, on the one hand, to spread out the generation of the heat of polymerization over a longer period of time and thus control, in a continuous process, the temperature profile as a function of time or location, e.g. in a tubular reactor. It is possible, for example, to make sure that a high temperature does not occur at initially high monomer concentration, whereas, on the other hand, a trouble-free polymerization is possible at the high temperature which is finally (i.e. at higher conversion) reached while achieving a high space-time yield at the same time. In this process, fouling no longer occurs.

EXAMPLES

Example 1

To 125 g of styrene and 500 g of cyclohexane in a 1 l stirred tank, 10 ml of an initiator mixture were added at 60° C. under nitrogen, with stirring. The initiator mixture was prepared in accordance with the components and molar Li/Al ratios given in Table 1 using an s-butyllithium solution (1.6 M in hexane s-BuLi), triisobutylaluminum solution (1.6 M in hexane, TIBA) or methylaluminoxane (10% strength in toluene, MAO), respectively, or lithium n-pentoxide (prepared from a 1.6 M s-butyllithium solution in hexane by adding the stoichiometric amount of n-pentanol) to contain 2.5 mmol, based on the total amount of metal atoms, and diluted to a volume of 10 ml using cyclohexane. The progress of the reaction was followed by taking samples. After a while the resulting solution was analyzed (Table 1):

TABLE 1

| Experiment | Initiator mixture | Li/Al (molar ratio) | Mw [g/mol] | Mw/Mn | Reaction time [h] | Conversion [%] |
|---|---|---|---|---|---|---|
| 1a | TIBA, Li n-pentoxide | 2/1 | 33870 | 1.2 | 6 | 88 |
| 1b | s-BuLi, MAO | 1/0.9 | 46300 | 1.3 | 2.4 | 27 |
| 1c (Control) | s-BuLi | | runs away; cyclohexane boils | | | |

Example 2

20 g of styrene and the initiator components of Tables 2–5 were placed in a glass ampoule at −70° C. under inert gas and fused in vacuo. The ampoules were allowed to reach room temperature, mixed homogeneously and immediately placed in a heating bath of the stated temperature. After the stated time, complete conversion was achieved in each case; no ampoules exhibited runaway characteristics.

Results are summarized in Tables 2–5.

TABLE 2

Initiator mixture of diethylaluminum ethoxide/s-BuLi

| | Example 2a | Example 2b | Example 2c |
|---|---|---|---|
| Et$_2$Al-OEt [mhm]* | 5 | 7.5 | 10 |
| s-BuLi [mhm]* | 5 | 5 | 5 |
| Temp. [° C.] | 75 | 90 | 150 |
| Time [h] | 1 | 1 | 1 |
| MN [g/mol] | 19,060 | 21,100 | 20,050 |
| $M_W/M_N$ | 1.16 | 1.11 | 1.08 |

*mhm = mmol per 100 g of styrene

TABLE 3

Initiator mixture of triisobutylaluminum (TIBA), triisobutoxyaluminum and s-BuLi

| | Example 2d | Example 2e | Example 2f | Example 2g |
|---|---|---|---|---|
| TIBA [mhm]* | 4 | 5 | 3 | 6 |
| (sBuO)$_3$Al [mhm] | 6 | 5 | 7 | 2 |
| s-BuLi [mhm]* | 5 | 5 | 5 | 5 |
| Temp. [° C.] | 120 | 120 | 120 | 120 |
| Time [h] | 1 | 0.5 | 0.3 | 1 |
| MN [g/mol] | 19,200 | 19,800 | 20,500 | 18,700 |
| $M_W/M_N$ | 1.17 | 1.21 | 1.17 | 1.24 |

*mhm = mmol per 100 g of styrene

TABLE 4

Initiator mixtures comprising various alkylaluminum compounds

| Experiment | Aluminum compound [mhm]$^a$ | s-BuLi [mhm]$^a$ | Temp. [° C.] | Time [h] | $M_N$ [g/mol] | $M_N/M_W$ |
|---|---|---|---|---|---|---|
| Example 2h | 10 mhm of Et$_2$AlOEt | 5 | 120 | 1 | 19,000 | 1.17 |
| Example 2i | 10 mhm of iBu$_2$AlOEt | 5 | 120 | 1 | 18,600 | 1.14 |
| Example 2j | 10 mhm of DIBTBKA | 5 | 120 | 1 | 19,800 | 1.19 |
| (Comparative) 2k | 10 mhm of (iBu)$_3$Al | 5 | 120 | 1 | no conversion | — | a) mhm = mmol per 100 g of styrene
b) DIBTBKA = diisobutyl-(2,6-di-tert-butyl-4-methylphenoxy)aluminum

TABLE 5

Initiator mixtures of alkylaluminum compound, alkyllithium compound and an additive.

| | Experiment 1 | Experiment 2 | Experiment 3 | Experiment 4 |
|---|---|---|---|---|
| TIBA [mhm]* | 10 | 10 | 10 | 10 |
| Additive | Ethanol | Butylamine | Dibutylamine | Dodecyl sulfide |
| in [mhm]* | 4 | 4 | 4 | 4 |
| s-BuLi [mhm]* | 5 | 5 | 5 | 5 |
| Temp. [° C.] | 120 | 120 | 120 | 120 |
| Time [h] | 1 | 0.5 | 0.5 | 1 |
| MN [g/mol] | 19,100 | 21,200 | 19,500 | 20,700 |
| $M_W/M_N$ | 1.20 | 1.10 | 1.13 | 1.17 |

*mhm = mmol per 100 g of styrene

The experiments of the Tables 2–5 show, inter alia, that the initiator mixtures according to the invention make it possible to conduct controlled polymerizations even above an Al/Li ratio of 1:1.

Example 3a 1.2 ml of a sec-butyllithium solution (1.3 M in cyclohexane) and 0.6 ml of styrene were added to 200 ml of cyclohexane and stirred for 4 hours.

30 ml of this solution were transferred to a 100 ml flask equipped with a fused-on UV cell. The concentration of the polystyryllithium as determined by UV spectroscopy was [PS-Li]=6.5 * 10$^{-3}$ M. This solution was mixed with 2.8 ml of 0.06 M solution of Et$_2$AlOEt in cyclohexane and then with 1.5 ml of styrene. The molar Al/Li ratio in the solution was r=0.85. The decrease in the styrene concentration of the solution was followed by UV spectroscopy in the UV cell at 100° C.. Virtually quantitative conversion was achieved after 70 minutes. The decrease in styrene concentration was analyzed according to a first order rate equation: ln ([styrene]$_0$/[styrene])=k$_a$ * t The constant k$_a$=0.036 min$^{-1}$ and [PS-Li] gave a reaction rate constant k$_p$=0.45 M$^{-0.5}$ min$^{-1}$. The number average molecular weight of the polystyrene of the final sample was $M_N$=7200 g/mol; the polydispersity was $M_W/M_N$=1.19.

The example was repeated under the same conditions using various Al/Li ratios. The results are shown in Table 6:

TABLE 6

| Example | Al/Li | k$_p$ M$^{-0.5}$ min$^{-1}$ | $M_N$ g/mol | $M_W/M_N$ |
|---|---|---|---|---|
| 3a | 0.85 | 0.45 | 7200 | 1.19 |
| 3b | 2 | 0.013 | 7400 | 1.09 |
| 3c | 3 | 7.3 * 10$^{-4}$ | 8100 | 1.03 |
| 3d | 5 | 6.5 * 10$^{-4}$ | 7300 | 1.07 |

TABLE 6-continued

| Example | Al/Li | $k_p$ $M^{-0.5}$ $min^{-1}$ | $M_N$ g/mol | $M_W/M_N$ |
|---|---|---|---|---|
| 3e (Comparative) | 0 | 18.5 | 7700 | 1.18 |
| 3f (Comparative) | ∞ | no conversion | — | — |

Example 4

6.5 ml of a 0.06 M solution of $Et_2AlOEt$ in cyclohexane were added to 30 ml of the polystyryllithium solution of Example 3 ([PS-Li]=6.5 * $10^{-3}$ M) in a 100 ml flask. The molar Al/Li ratio in the solution was r=2. The solution was kept at 150° C. for 3 h. 10.7 ml of styrene were then added at 100° C.. After 2 h, a polymer having a number average molecular weight $M_N$=49,500 g/mol and a polydispersity $M_W/M_N$=1.17 was quantitatively obtained.

In an identical reaction without $Et_2AlOEt$ addition, a blood-red solution was obtained while heating which could no longer initiate a styrene polymerization.

Example 5

1.0 ml of a sec-butyllithium solution (1.3 M in cyclohexane) and 1.4 ml of styrene were added to 200 ml of cyclohexane and stirred for four hours. 30 ml of this solution were transferred to a 100 ml flask equipped with a fused-on UV cell, the required amount of metal alkyl was added and the mixture was stored at the stated temperature. The decomposition of the polymerization-active species was followed via the time-dependence of its UV signal for 5–10 hours. At the end of the experiment it was shown by addition of styrene that the solutions to which the aluminum compounds had been added were still polymerization-active.

TABLE 7

| Example | Additive | Al/Li | T | $1_{max}$ | $t_{1/2}[h]$* |
|---|---|---|---|---|---|
| 5a (Control) | — | 0/1 | 100° C. | 327 nm | 3 h |
| 5b | $iBu_3Al$ | 0.85/1 | 100° C. | 280 nm | 250 h |
| 5c | $Et_2AlOEt$ | 2/1 | 100° C. | 283 nm | 300 h |

*1st-order half-life for the decrease of the UV signal

Example 6

Example 3 was repeated using trimethylboroxine or phenyldioxaborinane, respectively, instead of $Et_2AlOEt$ in cyclohexane. Trimethylboroxine gave a reaction rate constant $k_p$=2.0 $M^{-0.5}$ $min^{-1}$ at a molar $Me_3B_3O_3$/PS-Li ratio= 0.3. Phenyldioxaborinane gave a reaction rate constant $k_p$=0.54 $M^{-0.5}$ $min^{-1}$ at a molar B/Li ratio equal to 0.4. At 50° C. and the same metal ratio, the reaction rate constant kp was 0.03 $M^{-1}$. In the absence of the boron compound, the reaction rate constant was $k_p$=1.6 $M^{-0.5}$ $min^{-1}$ at 50° C.. The polydispersity of the polymers was $M_W/M_N$=1.19.

Example 7

Using the same procedure as described in Example 3, tri(isobutoxy)aluminum gave a reaction rate constant $k_p$=0.08 $M^{-0.5}$ $min^{-1}$ at a molar $Al(OiBu)_3$/PS-Li ratio of 0.8 and a temperature of 50° C..

Example 8

Using the same procedure as described in Example 3, methylaluminoxane (used as a 10% strength solution in toluene) gave a reaction rate constant $k_p$=0.04 $M^{-0.5}$ $min^{-1}$ at a molar MAO/PS-Li ratio of 0.85 and a temperature of 100° C.. At a molar MAO/PS-Li ratio of 2 and the same temperature the reaction rate constant was $k_p$=0.01 $M^{-0.5}$ $min^{-1}$.

Example 9

The reactor used for the continuous polymerization was a double-jacketed 3 l stirred tank equipped with a standard anchor stirrer. The reactor was designed for a pressure of 60 bar and was kept at a specified temperature by a heat-transfer medium to allow an isothermal polymerization. The initiator components were metered in via a common feed line using a static mixer. The feed line had a capacity of 160 ml.

The stirred tank was stirred (80 revolutions per minute) and continuously fed with 800 g/h of styrene and, via the common feed line, with a premixed initiator solution comprising 2.05 g/h of a 1.6 molar s-butyllithium solution in cyclohexane, 4.9 g/h of 25% strength by weight solution of diisobutylaluminum ethoxide in toluene and 180 ml/h of toluene (molar Li/Al ratio=1/2.2) and stirred at a constant bulk temperature of 110° C..

The effluent of the stirred tank was conveyed into two stirred 4 liter tower reactors arranged in series. The first tower reactor was operated at an internal temperature of 113° C.. To set the temperature in the second tower reactor, two heating zones of equal length which were arranged in series were used, the internal temperature at the end of the first zone being 135° C. and at the end of the second zone being 165° C.. The polymerization mixture was mixed with 5 g/h of n-butanol using a mixer at the outlet of the tower reactor, subsequently passed through a tube section heated to 260° C. and released into a vacuum pot kept at 25 mbar via a pressure control valve. The melt was discharged via a screw conveyor and pelletized.

A stable equilibrium state is reached in all parts of the unit after a few hours. The pressure drop across the whole unit was 2.1 bar. The solids content was 15.2% by weight at the outlet of the stirred tank, 43.8% by weight at the outlet of the first tower reactor and 81% by weight at the outlet of the second tower reactor, which corresponds to a monomer conversion of 100%. The polystyrene obtained had a molecular weight of Mw=163,000 g/mol and a polydispersity Mw/Mn of 2.68. The distribution was monomodal. Analysis showed a styrene content of less than 10 ppm, an ethylbenzene content of less than 10 ppm and a toluene content of 98 ppm.

Example 10

The reactor used for continuous polymerization was a double-jacketed tubular reactor having an internal diameter of 29.7 mm and a length of 2100 mm. The tubular reactor was designed for a pressure of up to 100 bar and for a temperature of up to 350° C.. The tubular reactor was kept at the specified temperature by a co-current heat-transfer medium flow and the temperature of the polymerization mixture was monitored by means of three temperature sensors arranged at regular intervals across the reaction section.

The tubular reactor was fed continuously with 0.8 l/h of styrene, 0.16 l/h of ethylbenzene and 53.3 ml/h of an initiator solution comprising 3.3 ml of a 1.6 molar s-butyllithium solution in cyclohexane, 10 ml of a 1.0 molar solution of diethylaluminum ethoxide in toluene and 40 ml of ethylbenzene (molar Li/Al ratio =1/1.9) via three separate pumps. The feed materials metered in were each cooled down to 5° C.. The temperature of the heat-transfer medium was 90° C. at the tubular reactor inlet. The polymerization solution reached its highest temperature of 194° C. at the outlet of the tubular reactor.

The polymerization mixture was discharged from the tubular reactor and a 20% strength by weight solution of methanol in ethylbenzene was metered in at a rate of 10 ml/h using a HPLC pump and homogenized in a downstream tube section by means of a static mixer. The polymer melt is released into a devolatilization pot kept at 20 mbar via a flow restriction valve, withdrawn by means of a screw pump, extruded and pelletized. The resulting polystyrene had a molecular weight $M_n$ of 131,000 and a polydispersity $M_w/M_n$ of 1.37. It contained less than 10 ppm of residual monomeric styrene.

We claim:

1. A process for the homopolymerization of vinylaromatic monomers or block copolymerization of vinylaromatic monomers and dienes in the presence of an initiator composition consisting essentially of
   I) at least one alkali metal organyl, alkali metal alkoxide, alkali metal thiolate or alkali metal amide and
   II) at least one aluminum organyl, aluminoxane, boron organyl or boroxane wherein the initiator composition contains, based on the sum of molar equivalents of alkali metal, aluminum and boron
   a) from 0.1 to 3.9 molar equivalents of oxygen, sulfur or nitrogen and
   b) from 0.1 to 3.9 molar equivalents of an organyl ligand.

2. A process as claimed in claim 1, wherein the initiator composition contains an aluminum or boron organyl.

3. A process as claimed in claim 1, wherein the alkali metal compound used is a lithium alkyl or lithium alkoxide.

4. A process as claimed in claim 1, wherein the aluminum organyl or aluminoxane used is a trialkylaluminum, dialkylaluminum alkoxide, dialkylaluminum aryloxylate or alkylaluminoxane.

5. A process as claimed in claim 1, wherein the molar ratio of alkali metal to aluminum and boron is in the range from 0.002 to 100.

6. A process as claimed in claim 1, wherein a premixed initiator composition comprising the alkali metal compound and the aluminum organyl, aluminoxane, boron organyl or boroxane is used.

7. A process for the homopolymerization of styrene as claimed in claim 1.

8. A process as claimed in claim 1, wherein the polymerization is carried out at an initial monomer concentration in the range from 50 to 100 percent by volume.

9. A process as claimed in claim 1, wherein the polymerization is carried out continuously.

10. A process as claimed in claim 1, wherein at least a part of the conversion is carried out in a non-backmixing reactor or reactor section.

11. A process for producing polystyrene, styrene/butadiene block copolymers or high-impact polystyrene comprising a homopolymerization step of styrene in the presence of an initiator composition consisting essentially of
   I) at least one alkali metal organyl, alkali metal alkoxide, alkali metal thiolate or alkali metal amide and
   II) at least one aluminum organyl, aluminoxane, boron organyl or boroxane, wherein the initiator composition contains, based on the sum of molar equivalents of alkali metal, aluminum and boron
   a) from 0.1 to 3.9 molar equivalents of oxygen, sulfur or nitrogen and
   b) from 0.1 to 3.9 molar equivalents of an organyl ligand.

* * * * *